US012664530B2

(12) United States Patent
Androulaki et al.

(10) Patent No.: US 12,664,530 B2
(45) Date of Patent: Jun. 23, 2026

(54) PRIVACY-PRESERVING SECURE OFFLINE PAYMENTS

(71) Applicant: International Business Machines Corporation, Armonk, NY (US)

(72) Inventors: Elli Androulaki, Zürich (CH); Kaoutar El Khiyaoui, Zurich (CH); Alessandro Sorniotti, Zurich (CH); Angelo De Caro, Zürich (CH); Marcus Brandenburger, Zurich (CH); Ilie Circiumaru, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 18/406,531

(22) Filed: Jan. 8, 2024

(65) Prior Publication Data

US 2025/0225488 A1      Jul. 10, 2025

(51) Int. Cl.
*G06Q 40/00*      (2023.01)
*G06Q 20/06*      (2012.01)
*H04L 9/32*      (2006.01)

(52) U.S. Cl.
CPC ......... *G06Q 20/065* (2013.01); *H04L 9/3221* (2013.01)

(58) Field of Classification Search
CPC ............................ G06Q 20/065; H04L 9/3221
See application file for complete search history.

(56) References Cited

U.S. PATENT DOCUMENTS

| | | | |
|---|---|---|---|
| 5,839,119 A | 11/1998 | Krsul | |
| 2011/0004539 A1* | 1/2011 | Angelo | .................. G06Q 40/04 |
| | | | 705/37 |
| 2018/0060844 A1* | 3/2018 | Brennan | .............. G06Q 20/108 |
| 2019/0229891 A1* | 7/2019 | Naqvi | ....................... H04L 9/14 |
| 2019/0244290 A1* | 8/2019 | Massacci | ............... G06Q 40/04 |
| 2019/0312734 A1* | 10/2019 | Wentz | .................. H04L 9/3239 |

(Continued)

FOREIGN PATENT DOCUMENTS

| | | | |
|---|---|---|---|
| IN | 202341027931 A | 5/2023 | |
| KR | 102052835 B1 | 1/2020 | |

(Continued)

OTHER PUBLICATIONS

Kent: "S-money: virtual tokens for a relativistic economy", Royal Society Publishing, vol. 475, Issue 2225, May 2019 (Year: 2019).*

(Continued)

*Primary Examiner* — Edward J Baird
(74) *Attorney, Agent, or Firm* — Stephen R. Yoder

(57) ABSTRACT

According to one embodiment, a method, computer system, and computer program product for conducting offline payments is provided. The embodiment may include adding funds from a funding source to an initial token using a commitment scheme. The embodiment may also include producing a proof that a value of a new token is equal to a value of the initial token. The embodiment may further include producing a signature for the new token. The embodiment may also include executing a transaction based on the initial token, the new token, the proof, and the signature. The embodiment may further include in response to executing the transaction, deleting the initial token.

12 Claims, 3 Drawing Sheets

(56)                    References Cited

U.S. PATENT DOCUMENTS

| | | | | |
|---|---|---|---|---|
| 2023/0186296 | A1* | 6/2023 | Vines | G06Q 20/389 |
| | | | | 705/71 |
| 2023/0267458 | A1 | 8/2023 | Furche | |
| 2023/0281583 | A1* | 9/2023 | Jakobsson | H04L 67/306 |
| | | | | 705/67 |
| 2024/0005409 | A1* | 1/2024 | Doney | G06Q 20/3678 |

FOREIGN PATENT DOCUMENTS

| | | | | |
|---|---|---|---|---|
| KR | 102118646 | B1 | 6/2020 | |
| WO | WO-2023118843 | A1 * | 6/2023 | G06Q 20/389 |

OTHER PUBLICATIONS

Dmitrienko et al., "Secure Wallet-Assisted Offline Bitcoin Payments with Double-Spender Revocation", ACM Digital Library, Asia CCS '17: Proceedings of the 2017 ACM on Asia Conference on Computer and Communications Security, Abu Dhabi, United Arab Emirates, Apr. 4-6, 2017, 12 Pages.

Li et al., "A search-theoretic model of double-spending fraud", ScienceDirect, Journal of Economic Dynamics & Control, vol. 142, Sep. 2022, 22 Pages.

Liu et al., "A Security Multi-Bank E-Cash Protocol Based On Smart Card", IEEE Xplore, Proceedings of the Sixth International Conference on Machine Learning and Cybernetics, Hong Kong, Aug. 19-22, 2007, 5 Pages.

Takaoglu et al., "Smart Card Based Offline Payment System for Central Bank Digital Currencies", Research Gate, Conference Paper, Blockchain and Cryptocurrency Congress (B2C' 2022), Barcelona, Spain, Nov. 2022, 7 Pages.

* cited by examiner

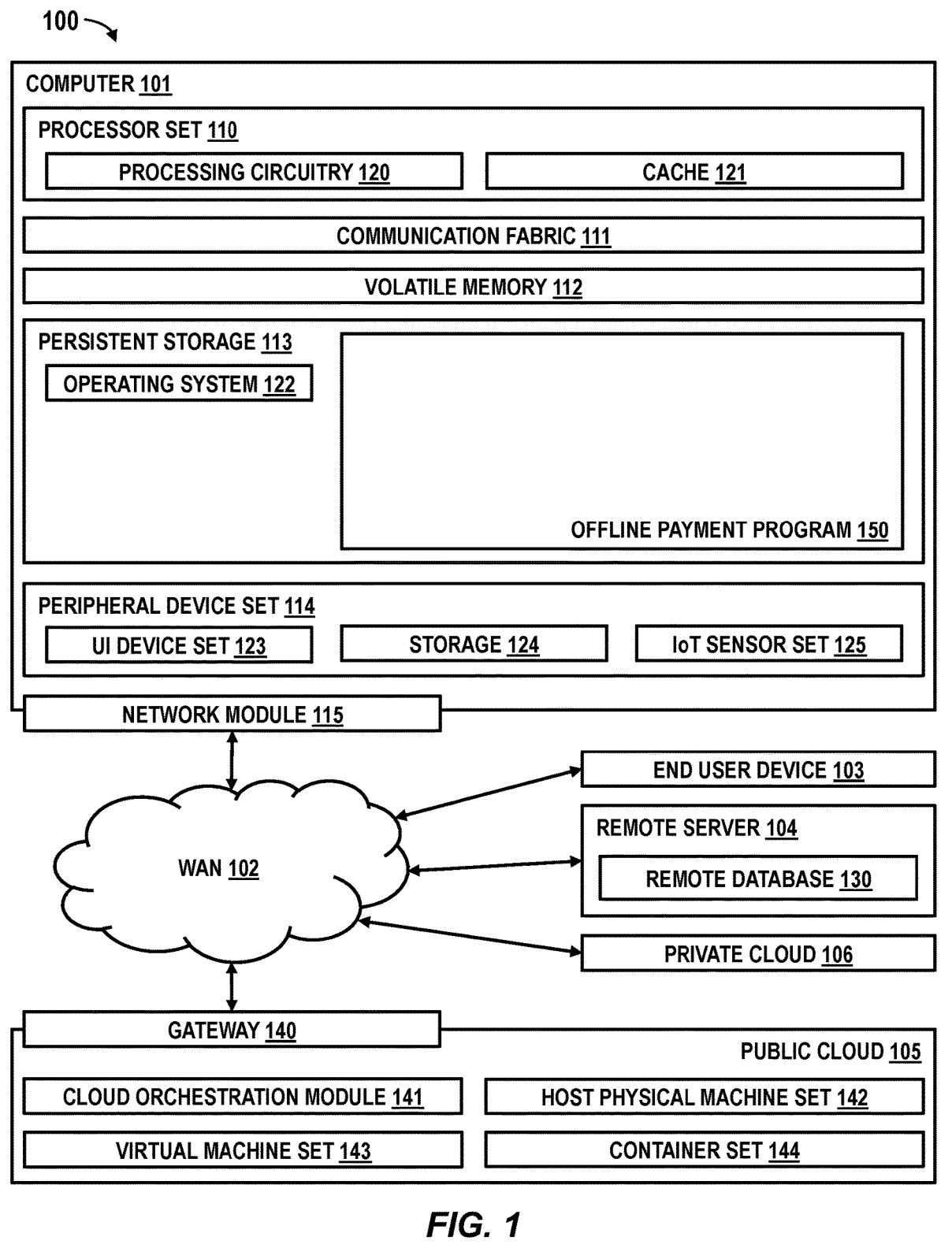

100

COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

OFFLINE PAYMENT PROGRAM 150

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

*FIG. 1*

PRIVACY-PRESERVING SECURE OFFLINE PAYMENTS

BACKGROUND

The present invention relates generally to the field of computing, and more particularly to electronic payments.

Electronic payments are a modern form of payment infrastructure that allows funds to be transferred through a computer, taking advantage of computational convenience and efficiency, telecommunications and networking technologies such as the internet, and technical security paradigms such as encryption and authentication. By connecting a paying user, a recipient, and various financial institutions, electronic payments make fast, secure payments dramatically simpler, reduce transaction costs, and make it possible to keep convenient access to funds kept secure in a bank account, without concern for the physical location of any paper money.

SUMMARY

According to one embodiment, a method, computer system, and computer program product for conducting offline payments is provided. The embodiment may include adding funds from a funding source to an initial token using a commitment scheme. The embodiment may also include producing a proof that a value of a new token is equal to a value of the initial token. The embodiment may further include producing a signature for the new token. The embodiment may also include executing a transaction based on the initial token, the new token, the proof, and the signature. The embodiment may further include in response to executing the transaction, deleting the initial token.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary networked computer environment according to at least one embodiment.

DETAILED DESCRIPTION

Figure 2:
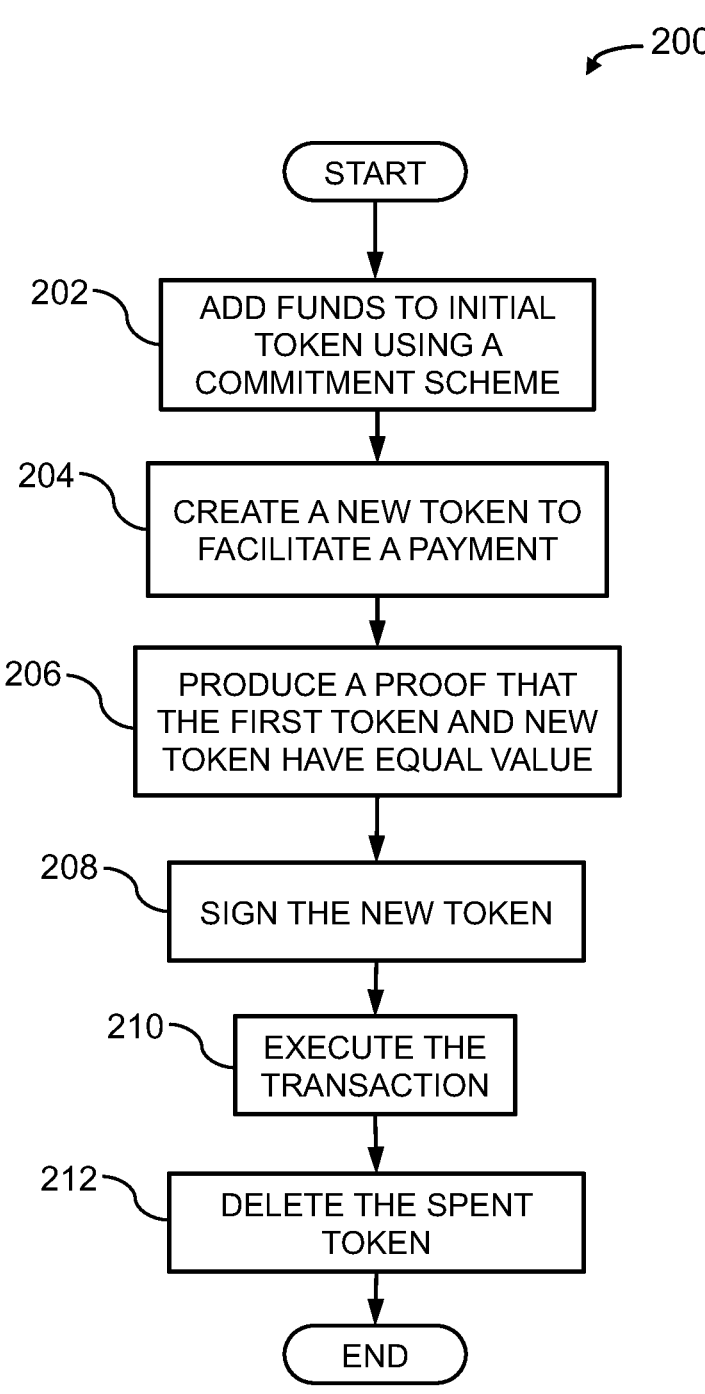
FIG. 2 illustrates an operational flowchart for a process for facilitating secure, private payments without a connection to the internet.

According to an aspect of the invention, there may be a method for conducting offline payments. The method may include adding funds from a funding source to an initial token using a commitment scheme. The method may also include producing a proof that a value of a new token is equal to a value of the initial token. The method may further include producing a signature for the new token. The method may also include executing a transaction based on the initial token, the new token, the proof, and the signature. The method may further include, in response to executing the transaction, deleting the initial token.

The advantages of this method may include allowing for secure, anonymous payments between any number of devices without an internet connection.

In embodiments, the produced proof may be a zero-knowledge proof. This may assist in keeping information as private as possible while still creating a trustworthy chain of transactions.

In embodiments, the new token may be deposited into a receiving intermediary. Furthermore, the value of the transaction may be settled between a central authority and the receiving intermediary. Further, still, the deposited token may be deleted. This allows a recipient to realize the value of the transaction in a format other than offline tokens, such as cash value in a bank account.

In embodiments, the method may create a ciphertext of a user's identity corresponding to a given token. The method may also include sending the ciphertext along with a given executed transaction corresponding to the given token. This may assist in finding double spenders without compromising the anonymity of the transaction in day-to-day scenarios.

In embodiments, the method may further involve identifying that the given token was spent twice. The method may also include decrypting the ciphertext. By decrypting the ciphertext corresponding to the twice-spent token, the method may allow an auditor to identify a double-spender without compromising the anonymity of any other user.

In embodiments, the signing is performed using anonymous credentials. This may further assist with the anonymity of the method.

According to an aspect of the invention, there may be a computer system for conducting offline payments. The system may include adding funds from a funding source to an initial token using a commitment scheme. The system may also include producing a proof that a value of a new token is equal to a value of the initial token. The system may further include producing a signature for the new token. The system may also include executing a transaction based on the initial token, the new token, the proof, and the signature. The system may further include, in response to executing the transaction, deleting the initial token.

The advantages of this system may include allowing for secure, anonymous payments between any number of devices without an internet connection.

In embodiments, the produced proof may be a zero-knowledge proof. This may assist in keeping information as private as possible while still creating a trustworthy chain of transactions.

In embodiments, the new token may be deposited into a receiving intermediary. Furthermore, the value of the transaction may be settled between a central authority and the receiving intermediary. Further, still, the deposited token may be deleted. This may allow a recipient to realize the value of the transaction in a format other than offline tokens, such as cash value in a bank account.

In embodiments, the system may create a ciphertext of a user's identity corresponding to a given token. The system may also include sending the ciphertext along with a given executed transaction corresponding to the given token. This may assist in finding double spenders without compromising the anonymity of the transaction in day-to-day scenarios.

In embodiments, the system may further involve identifying that the given token was spent twice. The system may also include decrypting the ciphertext. By decrypting the ciphertext corresponding to the twice-spent token, the system may allow an auditor to identify a double-spender without compromising the anonymity of any other user.

In embodiments, the signing is performed using anonymous credentials. This may further assist with the anonymity of the method.

According to an aspect of the invention, there may be a computer program product for conducting offline payments. The product may include adding funds from a funding source to an initial token using a commitment scheme. The product may also include producing a proof that a value of a new token is equal to a value of the initial token. The product may further include producing a signature for the new token. The product may also include executing a transaction based on the initial token, the new token, the proof, and the signature. The product may further include, in response to executing the transaction, deleting the initial token.

The advantages of this product may include allowing for secure, anonymous payments between any number of devices without an internet connection.

In embodiments, the produced proof may be a zero-knowledge proof. This may assist in keeping information as private as possible while still creating a trustworthy chain of transactions.

In embodiments, the new token may be deposited into a receiving intermediary. Furthermore, the value of the transaction may be settled between a central authority and the receiving intermediary. Further, still, the deposited token may be deleted. This allows a recipient to realize the value of the transaction in a format other than offline tokens, such as cash value in a bank account.

In embodiments, the product may create a ciphertext of a user's identity corresponding to a given token. The product may also include sending the ciphertext along with a given executed transaction corresponding to the given token. This may assist in finding double spenders without compromising the anonymity of the transaction in day-to-day scenarios.

In embodiments, the product may further involve identifying that the given token was spent twice. The product may also include decrypting the ciphertext. By decrypting the ciphertext corresponding to the twice-spent token, the product may allow an auditor to identify a double-spender without compromising the anonymity of any other user.

In embodiments, the signing is performed using anonymous credentials. This may further assist with the anonymity of the method.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to electronic payments. The following described exemplary embodiments provide a system, method, and program product to, among other things, enable secure, private offline payments. Therefore, the present embodiment has the capacity to improve the technical field of electronic payments by creating a new security scheme that may further enable offline payments.

As previously described, electronic payments are a modern form of payment infrastructure that allows funds to be transferred through a computer, taking advantage of computational convenience and efficiency, telecommunications and networking technologies such as the internet, and technical security paradigms such as encryption and authentication. By connecting a paying user, a recipient, and various financial institutions, electronic payments make fast, secure payments dramatically simpler, reduce transaction costs, and make it possible to keep convenient access to funds kept secure in a bank account, without concern for the physical location of any paper money.

Because electronic payments are so convenient, efficient, and secure, they have become extremely prevalent. Typical electronic payment systems require constant communication with banks and other entities that hold currency or provide credit; accordingly, they use an internet connection or similar network connection to facilitate payments. However, such long-range telecommunications networks are not always available, and users may require payment infrastructure even when offline. As such, it may be advantageous to store funds in secure local tokens to facilitate secure offline transactions.

According to one embodiment, an offline payment program adds funds to an initial token using a commitment scheme. The offline payment program then creates a new token to facilitate a transaction, a proof representing the value of the transaction, and a signature for the new token. The offline payment program then executes the transaction. The offline payment program then deletes the spent token.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as offline payment program 150. In addition to offline payment program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and offline payment program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in offline payment program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in offline payment program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth® (Bluetooth and all Bluetooth-based trademarks and logos are trademarks or registered trademarks of the Bluetooth Special Interest Group and/or its affiliates) connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The offline payment program 150 may add funds to an initial token using a commitment scheme. The offline payment program 150 may further facilitate a transaction by creating a new token, producing a proof that the value of the token being spent is equal to the value of the token being created, and signing the new token. The offline payment program 150 may then execute the transaction. The offline payment program 150 may then delete the previous token once it has been spent.

Furthermore, notwithstanding depiction in computer 101, offline payment program 150 may be stored in and/or executed by, individually or in any combination, end user device 103, remote server 104, public cloud 105, and private cloud 106. The data management method is explained in more detail below with respect to FIG. 2.

Referring now to FIG. 2, an operational flowchart for a process for conducting offline payments 200 is depicted according to at least one embodiment. At 202, the offline payment program 150 adds funds to an initial token with a commitment scheme. Funds may be added from an intermediary bank or other funding source. Adding funds may include creating an initial token or, alternatively, starting from an existing token compatible with the process for conducting offline payments 200. Adding funds may further include signing the initial token by a central authority, such as a central bank or settling bank. The initial token may be stored on a local device, a local device's secure element, or an external device such as a smart card.

A commitment scheme, which may also be referred to as a binding commitment scheme, may be a scheme for committing certain variables in the token without making that information visible to all parties at all times. A commitment scheme may utilize binding properties (that cannot be changed) and hiding properties (that are hidden) under certain conditions. Data may be hidden according to various methods, including encryption methods, such as public-key encryption; blind signatures; anonymization methods, such as use of an anonymous user ID or tokenized identifier in place of identifiable user information; or not placing data in a token to begin with. For example, data required for legal compliance purposes may be kept by an intermediary bank or centralized bank, and associated with a user ID, but not included in a token. Encrypted data may be encrypted in a manner that can only be decrypted by particular parties. For example, a user ID may be encrypted so that the central bank and a receiving bank cannot view it, but the funding source can view it. In a further example, the creation of the token using the commitment scheme may be structured so that the withdrawal and deposit cannot be linked to one another; so that the central bank knows the amount of funds committed, and knows the identity of the funding source, but does not know what user committed the funds; and so that users at different points in the transaction chain cannot identify one another.

Funds may be added or "committed" to the token from an intermediary bank (such as a consumer bank) or any other funding source, including a credit card company, an internet account, or another token, including a preexisting token used for a previous offline payment, or a cryptocurrency token. The token may then be signed by a central authority, such as a central bank, settling body, or any other entity capable of settling the payment between the funding source and a receiving bank or similar. Funds may be added over a network, such as the internet, or over a more localized connection, such as NFC between a smart card and an Automated Teller Machine (ATM).

In some embodiments, the signature by the central authority may be a blind signature, to be visible to certain parties but not others. For example, a blind signature may be invisible to an intermediary bank or funding source, but may then be unblinded by a user. A blind signature for an initial token may be represented, for example, as go.

The funding source may charge the recipient any type of fee for the services involved in committing funds to the token, including a percentage of the value of the token, a flat fee, a regular service fee such as an annual fee, or any combination thereof. Alternately, the central bank may charge a fee to the funding source or the receiving intermediary, or both.

The initial token may be stored on a local device, a secure element on a local device, or an external device, such as a smart card, smart wallet, or any other device capable of securely storing the token or filling the role of a secure element. An external device may be paired or communicatively coupled with a user device, such as an NFC connection connecting a smart card to a mobile phone, or a wired connection connecting a smart wallet to a laptop computer.

A token may contain or be generated based on its value, owner ID, a random number such as a seed, or other data or metadata, such as the date at which the token is created. An example token may be represented by the formula:

$$\tau_0 = C(u_0, v, s_0)$$

wherein $\tau_0$ represents the initial token (the token at index 0, where 0 transactions have taken place), C represents the commitment scheme, $u_0$ represents a user who owns or is meant to own $\tau_0$, $v$ is the value of the token and so represents a random seed to facilitate the commitment scheme.

The offline payment program 150 may identify and load funds onto any number of tokens, and may identify or add funds to new tokens at any point in the process for conducting offline payments 200.

Then, at 204, the offline payment program 150 creates a new token to facilitate payment or transaction. The new token may be created based on a "current token." The new token may be created on or transferred to a device corresponding to a recipient of the payment. Creating a new token does not require an internet connection.

The "current token" or "previous token" may be the token spent in the payment being facilitated by the new token. Upon being spent, the "current token" may be referred to as the "spent token." If the current token is the initial token, it may be thought of as having an index 0; the new token created from a first transaction involving the initial token may then have index 1; a second transaction may then use the token at index 1 to create a new token at index 2, and so on. A user who owns the "current token" may be referred to as a spender or spending user, and the user receiving the new token may be referred to as a recipient or receiving user.

The term "transaction" may be construed to refer to any event that includes the transfer of a token from one party to another, including, for example, a payment (for goods or services), gift, loan, trade, or donation. For example, a paying user may trade a token of $60 value for $60 in paper money from the recipient of the token.

The new token may be created on or transferred to and then stored on the receiving user's local device, an embedded secure element on a local device, or an external device, such as a smart card, smart wallet, or any other device capable of securely storing the token or filling the role of a secure element. For example, creating a new token may include using a secure element to sign a new token at 208 and delete the previous token at 212. The term "secure element" used herein may refer to any component or device that performs the function of a secure element, whether it is an embedded secure element or an external secure element such as a smart card.

A user may be a person, an organization, or any other entity. For example, a recipient user may be a food truck. Alternatively, there may not be a user; for example, a recipient may be a point-of-sale device that receives payments and responds automatically without a human user nearby.

A new token at index i may be represented, for example, by the formula:

$$\tau_i = C(u_i, v, s_i)$$

Any number of tokens may be created during the process for conducting offline payments 200. Creating a new token may include producing a proof at 206, signing the new token at 208, or deleting the now spent token at 212. Two or more of these steps may be tied together by function of the secure element so that, for example, a previous token is necessarily deleted or disabled as soon as the new token is created and signed.

The process for conducting offline payments 200 may involve any number of transactions, from one transaction to any arbitrarily large number. Any token may be transacted any number of times. In some embodiments, a user to eventually settle the value of a transaction and deposit a token's value with an intermediary entity or central authority, such as an intermediary bank or central bank, as described below at 210 and in FIG. 3.

Next, at 206, the offline payment program 150 produces a proof that the current token and new token share an equal value. The proof may be a zero-knowledge proof. The proof for a new token at index i may be represented by $\psi_i$. Producing a proof does not require an internet connection.

In alternate embodiments, additional calculations and proofs may be used to securely split the value of the current token into two or more tokens or spend a portion of the token, as opposed to the entire token. Further, still, the offline payment program 150 may offer a method to combine the value of two or more tokens, or to spend two or more tokens in one combined transaction.

The offline payment program 150 may produce a new proof at any point in the process for conducting offline payments 200, so long as there is sufficient information available about the current token or spent token.

Then, at 208, the offline payment program 150 signs the new token. Signing a token does not require an internet connection. Signing a token may produce a signature, which may be represented, for example, by the variable $\phi$.

Signature $\phi_i$ may represent a signature based on the pair $\tau_{i-1}$, $\tau_i$ where i represents the index of the new token. The token may be signed using anonymous credentials, and the signature may be an anonymous signature.

A token may be signed at any point during the process for conducting offline payments 200, including concurrently with any other step, and any number of tokens may be signed. Signing may be tied to another function in time or order. For example, the offline payment program 150 may require that the signing be performed by a secure element, in order to ensure that the previous token used to sign a new token is always deleted as soon as the signing is performed.

Signing may include checking a signature for validity or security. In a further example, upon signing a token, checking the signature, and finding that an error has taken place, the previous token may not be deleted, or may be temporarily disabled, until the error is resolved and corrected, in which case the previous token may be deleted, or may be marked unspent, as necessary.

Then, at 210, the offline payment program 150 executes or sends the payment or transaction. Executing a transaction may be performed over a local connection, such as a wired connection NFC connection, or LAN, and need not require an internet connection.

A transaction may be sent from a paying user to a receiving user. Transactions may be encoded as a series of tokens or references to tokens, signatures, represented as:

$$t_i = (\tau_0, \dots, \tau_i, \sigma_0, \phi_1, \dots, \phi_i, \psi_1, \dots, \psi_i)$$

where $t_i$ represents the transaction that creates the token $\tau_i$ at index i, $\tau_j$ represents a token or reference to a token at index j, $\sigma_0$ represents the original signature on the initial token $\tau_0$ from the central authority, $\phi_j$ represents the signature on the token at index j from the owner of $\tau_{j-1}$, and $\psi_j$ represents the proof that the value of $\tau_j$ is equal to the value of $\tau_{j-1}$.

Any number of transactions may be sent at any time during the process for conducting offline payments 200.

In at least one embodiment, upon executing the payment or transaction, a token may be deposited by a receiving intermediary such as an intermediary bank, consumer bank, internet account, or other depository of value, or may be settled by a central authority such as a settling bank. For example, the recipient of the fifth transaction in a series of transactions may decide to deposit the value of the token with the recipient's consumer bank, which may then settle the transaction through a central bank that signed the initial token. Settling may include, for example, transferring funds, directly or in effect through some aggregate settlement, from the settling bank to the recipient's intermediary. Upon settlement, the recipient's intermediary may credit the recipient's account with the value of the token. The recipient's intermediary may charge the recipient any type of fee for this service, including a percentage of the value of the token, a flat fee, a regular service fee such as an annual fee, or any combination thereof. Alternatively, the central bank may charge a fee to the funding source or the receiving intermediary, or both.

In an alternate embodiment, a user may claim that a token is lost. If that token is not settled, it may be treated as lost funds, or may, with some method to ensure that the token is not spent, be refunded to a user. Ensuring that the token is not spent may include a process of auditing, such as the process of auditing to prevent double spending below, or an imposed time limit, such as a requirement that a token be settled with a settling bank within one year of the last recorded transaction, or else, if the last known recipient claims the token is lost, the token's value may be refunded to the last known recipient. Alternately, the value of the token may be insured by an insuring entity, such as an insurance company or insuring bank, which may have its own business policies regarding when to pay out the value of the token to a user claiming to have lost the token.

A token may be deposited, settled, or marked lost at any point during the process for conducting offline payments 200, including in response to an executed transaction, in response to finding an available internet connection, upon a request by the current holder or latest recipient of the token, or never. In a further embodiment, the offline payment program 150 may notify a holding user that a token may be deposited once an internet connection becomes available, or after a certain period of time, such as a predetermined period of time or at an algorithmically determined period of time.

Then, at 212, the offline payment program 150 deletes the spent token. The spent token may be deleted at the moment the new token is created or signed, at the moment the transaction is executed or sent, or at any other point that ensures that a token is deleted once spent, or minimizes the risk of double-spending of the same token. Deleting the spent token does not require an internet connection.

The "current token" or "previous token" may, upon being spent or used in a transaction, be referred to as the "spent token."

Specifically, deleting the spent token may be performed by or on the secure element, and may be combined with another function, such as creating the new token at 204, signing the new token at 208, or executing or sending a transaction at 210. The secure element may treat these functions as atomic or necessarily combined in order to prevent double-spending or loss of a token, and may include safeguards to prevent such mishandling or errors.

In alternate embodiments, the offline payment program 150 may disable the spent token, for example, by marking it as spent, setting its value to zero, or deleting part of the token so that it can no longer be used to sign a new token.

Any number of tokens may be deleted or disabled during the process for conducting offline payments 200, at any time. In some embodiments, users may be able to delete or disable tokens manually. In further embodiments, users may have an option to refund a token, returning the funds added to the account or entity from which the token was funded.

In further embodiments, a token may be also be deleted or disabled once deposited or settled at 210. As with other steps, deleting may be tied necessarily to depositing in order to prevent spending of tokens that have been deposited.

Then, the process for conducting offline payments 200 may be audited, for example by a trusted third-party auditor, in order to identify a particular user as a double spender when double spending is detected during the deposit of an offline token. Double spending may refer to a case where a given token has been spent twice, or more than twice, or has been both spent and deposited. A double spender may be a user who engages in double spending.

To account for double spending at or before index i, an auditor's encryption key may be used to create a ciphertext $C_j$ representing user $u_j$ at each transaction j+1, and produce a proof $\pi_j$ that $C_j$ is correct, so that the auditor may decrypt $C_j$ and identify user $u_j$, as necessary, for all j such that $0 \le j \le i$. Sending a transaction may, then, further entail sending $C_j$ and $\pi_j$, and may be represented by the expression:

$$t_i = (\tau_0, \ldots, \tau_i, \sigma_0, \phi_1, \ldots, \phi_i, \psi_1, \ldots, \psi_i, C_0, \pi_0, \ldots, C_i, \pi_i)$$

Accordingly, when double spending is detected at index k, the auditor may decrypt $C_k$ to identify the double spender.

Double spending may be identified, for example, by identifying two transactions in the ledger that begin with the same $\tau_0$ but diverge at a later point.

Upon identifying a double spender, the auditor or the offline payment program 150 may take an action or make a recommendation regarding addressing the double spending. Actions may include charging the double spender a fee or fine, referring the double spender to a financial crime or fraud authority such as a government enforcement agency, notifying a relevant bank or credit agency about the double spending, or initiating a communication between the double spender and a relevant authority such as the double spender's consumer bank. Alternatively, the auditor or the offline payment program 150 may recommend any of these courses of action to a relevant authority, including a government agency, relevant bank, or credit agency.

Figure 3:
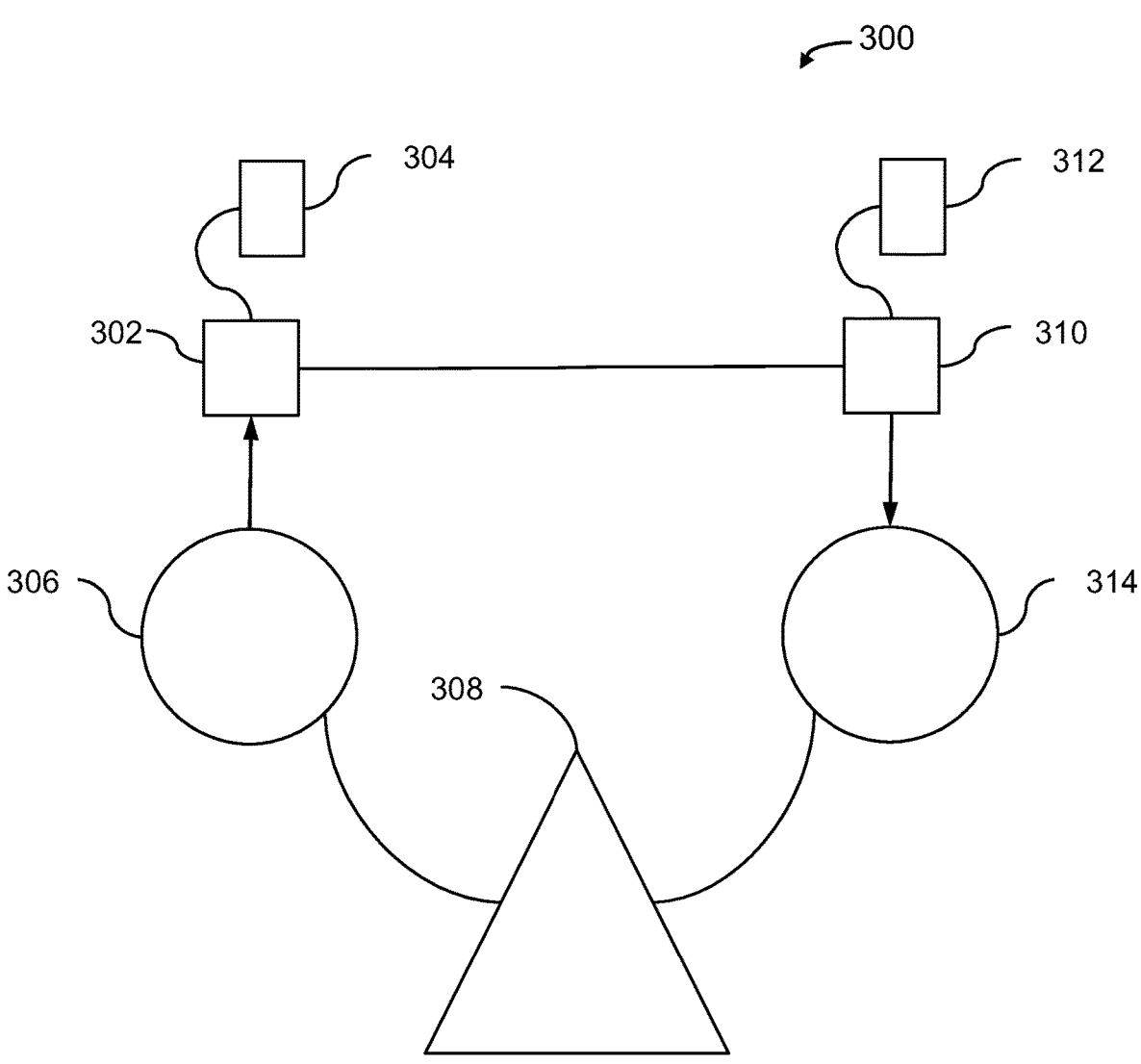
FIG. 3 illustrates an exemplary transaction path through multiple points.

Referring now to FIG. 3, an exemplary transaction path through multiple points 300 is depicted according to at least one embodiment. In at least one embodiment, an initial paying user may initiate a request from user device 302 from funding source 306 to commit funds to a token. The token may be signed by central authority 308 and stored on secure element 304, before its value is transferred by a transaction to a new token on secure element 312. User device 310 may then deposit the value of the token into receiving intermediary 314, before being settled by central authority 308.

User devices 302 and 310 may, for example, be mobile phones, laptops, smart watches, or any other devices from which a user may initiate a funding request or transaction, or manage, accept, or negotiate a transaction. Each user device 302 and 310 may be communicatively coupled with, or have embedded within it, secure element 304 or 312. A secure element 304 or 312 may be, for example, an embedded secure element component within user device 302 or 310, a smart card, a smart wallet, or any other device or component capable of filling the role of a secure element as described at 202.

Intermediaries such as funding source 306 and receiving intermediary 314 may be, for example, consumer banks, internet-based accounts, other tokens, or any other funding source or receiving intermediary described at 202 or 210. Central authority 308 may, for example, be a central bank, settling bank, clearing house, or other entity capable of settling the transaction as described at 210.

The transaction between user devices 302 and 310 may be conducted over a local connection such as a wired connection, NFC connection, LAN connection, Bluetooth® connection, or through use of a QR code. Alternatively, a user device may connect directly to a secure element; for example, the initial user may use a smart card secure element 304 to pay the receiving user on user device 304, where user device 304 is communicatively coupled with a specialized peripheral device for reading smart cards.

In further embodiments, there may be a series of transactions from initial user device 302, through several other user devices, to the final recipient 310. Funding a token at 202 or depositing value at 210 may further include more than one intermediary; for example, central authority 308 may interact with a general intermediary bank 306, which may then interact with a consumer payment service intermediary 306, which may interact with a consumer payment application on user device 302.

It may be appreciated that FIGS. 2 and 3 each provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for an interim commitment scheme maintaining security during offline transactions, the method comprising:

adding, by a paying user, funds from a funding source to an initial token using an initial commitment scheme, the initial commitment scheme including a paying user identification (ID), an initial monetary value of the initial token, and an initial random seed number;

creating, by the paying user, a new token for an offline transaction with a receiving user, the new token being based on the initial token, a new commitment scheme of the new token includes the initial commitment scheme and adds the paying user ID, a new monetary value of the new token, and a new random seed number, wherein creating the new token without an internet connection includes:

producing a proof that a value of the new token is equal to a value of the initial token, the proof being a zero-knowledge proof;

producing, by a secure element, a signature for the new token using anonymous credentials, via blind signatures, wherein producing the signature includes checking the signature for validity;

executing a transaction between the paying user and the receiving user based on the initial token, the new token, the proof, and the signature; and in response to executing the transaction with the receiving user, deleting, by the secure element, the initial token;

depositing the new token into a receiving intermediary;

settling the value between a central authority and the receiving intermediary, wherein the new monetary value of the new token is equal to the initial value of the initial token; and upon successfully settling the value, deleting the new token, as a post-transaction value of the new token is zero.

2. The method of claim 1, wherein the initial token is stored on the secure element.

3. The method of claim 1, further comprising:

creating a ciphertext of paying user's identity corresponding to the new token; and sending the ciphertext along with the executed transaction between the paying user and the receiving user corresponding to the initial token, the new token, the proof, and the signature.

4. The method of claim 3, further comprising:

identifying that the initial token was spent twice; and decrypting the ciphertext.

5. A computer system for an interim commitment scheme maintaining security during offline transactions, the computer system comprising:

one or more processors, one or more computer-readable memories, one or more computer-readable storage media, and program instructions stored on at least one of the one or more computer-readable storage media for execution by at least one of the one or more processors via at least one of the one or more computer-readable memories, wherein the program instructions cause the one or more processors to perform a method comprising:

adding, by a paying user, funds from a funding source to an initial token using an initial commitment scheme, the initial commitment scheme including a paying user identification (ID), an initial monetary value of the initial token, and an initial random seed number;

creating, by the paying user, a new token for an offline transaction with a receiving user, the new token being based on the initial token, a new commitment scheme of the new token includes the initial commitment scheme and adds the paying user ID, a new monetary value of the new token, and a new random seed number, wherein creating the new token without an internet connection includes:

producing a proof that a value of the new token is equal to a value of the initial token, the proof being a zero-knowledge proof;

producing, by a secure element, a signature for the new token using anonymous credentials, via blind signatures, wherein producing the signature includes checking the signature for validity;

executing a transaction between the paying user and the receiving user based on the initial token, the new token, the proof, and the signature; and in response to executing the transaction with the receiving user, deleting, by the secure element, the initial token;

depositing the new token into a receiving intermediary;

settling the value between a central authority and the receiving intermediary, wherein the new monetary value of the new token is equal to the initial value of the initial token; and upon successfully settling the value, deleting the new token, as a post-transaction value of the new token is zero.

6. The computer system of claim 5, wherein the initial token is stored on the secure element.

7. The computer system of claim 5, further comprising:

creating a ciphertext of paying user's identity corresponding to the new token; and sending the ciphertext along with the executed transaction between the paying user and the receiving user corresponding to the initial token, the new token, the proof, and the signature.

8. The computer system of claim 7, further comprising:

identifying that the initial token was spent twice; and decrypting the ciphertext.

9. A computer program product comprising:

one or more computer-readable storage media and program instructions stored on at least one of the one or more computer-readable storage media, the program instructions executable by a processor capable of performing a method comprising:

adding, by a paying user, funds from a funding source to an initial token using an initial commitment scheme, the initial commitment scheme including a paying user identification (ID), an initial monetary value of the initial token, and an initial random seed number;

creating, by the paying user, a new token for an offline transaction with a receiving user, the new token being based on the initial token, a new commitment scheme of the new token includes the initial commitment scheme and adds the paying user ID, a new monetary value of the new token, and a new random seed number, wherein creating the new token without an internet connection includes:

producing a proof that a value of the new token is equal to a value of the initial token, the proof being a zero-knowledge proof;

producing, by a secure element, a signature for the new token using anonymous credentials, via blind signatures, wherein producing the signature includes checking the signature for validity;

executing a transaction between the paying user and the receiving user based on the initial token, the new token, the proof, and the signature; and in response to executing the transaction with the receiving user, deleting, by the secure element, the initial token;

depositing the new token into a receiving intermediary;

settling the value between a central authority and the receiving intermediary, wherein the new monetary value of the new token is equal to the initial value of the initial token; and upon successfully settling the value, deleting the new token, as a post-transaction value of the new token is zero.

10. The computer program product of claim 9, wherein the initial token is stored on the secure element.

11. The computer program product of claim 9, further comprising:

creating a ciphertext of paying user's identity corresponding to the new token; and sending the ciphertext along with the executed transaction between the paying user and the receiving user corresponding to the initial token, the new token, the proof, and the signature.

12. The computer program product of claim 11, further comprising:

identifying that the initial token was spent twice; and decrypting the ciphertext.

\* \* \* \* \*